US007885689B2

(12) United States Patent
Venkatesan (10) Patent No.: US 7,885,689 B2
(45) Date of Patent: Feb. 8, 2011

(54) SUPPRESSING INTERFERENCE USING BEAMFORMING OF UPLINK SIGNALS RECEIVED AT MULTIPLE BASE STATIONS

(75) Inventor: Sivarama K. Venkatesan, Milltown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 748 days.

(21) Appl. No.: 11/763,046

(22) Filed: Jun. 14, 2007

(65) Prior Publication Data

US 2008/0309554 A1 Dec. 18, 2008

(51) Int. Cl.
*H04M 1/00* (2006.01)
(52) U.S. Cl. .................. 455/562.1; 455/561; 455/456.5; 455/524
(58) Field of Classification Search .................. 455/561, 455/442, 522, 69, 420, 435.2, 452.2, 513, 455/524, 525, 67.13, 552.1, 88, 556.1, 114.2, 455/562.1; 370/441, 342, 334, 347, 442, 370/344, 254, 329, 295; 375/267
See application file for complete search history.

(56) References Cited

U.S. PATENT DOCUMENTS

| 2002/0105928 | A1* | 8/2002 | Kapoor et al. | 370/334 |
| 2002/0114269 | A1* | 8/2002 | Onggosanusi et al. | 370/208 |
| 2002/0146029 | A1* | 10/2002 | Kavak et al. | 370/441 |
| 2003/0048760 | A1* | 3/2003 | Park et al. | 370/295 |
| 2006/0104197 | A1* | 5/2006 | Proctor et al. | 370/209 |
| 2006/0285504 | A1* | 12/2006 | Dong et al. | 370/254 |
| 2007/0092019 | A1* | 4/2007 | Kotecha et al. | 375/267 |
| 2008/0144738 | A1* | 6/2008 | Naguib | 375/299 |
| 2008/0167047 | A1* | 7/2008 | Abedi | 455/442 |
| 2009/0190688 | A1* | 7/2009 | Kotecha et al. | 375/267 |

* cited by examiner

*Primary Examiner*—Tan Trinh
(74) *Attorney, Agent, or Firm*—Williams, Morgan & Amerson, P.C.

(57) ABSTRACT

The present invention provides a method for suppressing interference using beamforming of uplink signals received at multiple base stations. The method may include accessing information indicative of a plurality of signals received over a plurality of uplink channels between a plurality of mobile units and a plurality of base stations. The method may also include forming a plurality of weighted signals by applying a plurality of beamforming weights to the plurality of signals. The plurality of beamforming weights are determined based on estimates of the channels from the plurality of users to the plurality of base stations and estimated interference between the signals. The method may further include combining subsets of the plurality of weighted signals associated with each of the plurality of mobile units.

16 Claims, 10 Drawing Sheets

SUPPRESSING INTERFERENCE USING BEAMFORMING OF UPLINK SIGNALS RECEIVED AT MULTIPLE BASE STATIONS

BACKGROUND OF THE INVENTION

1. Field of the Invention

This invention relates generally to communication systems, and, more particularly, to wireless communication systems.

2. Description of the Related Art

Base stations in wireless communication systems provide wireless connectivity to users within the geographic area, e.g., a cell or sector, associated with the base station. The wireless communication links between the base station and each of the users typically include one or more downlink (or forward) channels for transmitting information from the base station to the mobile unit and one or more uplink (or reverse) channels for transmitting information from the mobile unit to the base station. Transmissions over the uplink and/or downlink channels may interfere with each other. For example, in wireless communication systems that implement asynchronous code division multiple access (CDMA), a mobile unit in a first sector or cell experiences interference from other mobile units in the first sector or cell, as well as interference from mobile units in other sectors or cells. Time division multiple access (TDMA) or orthogonal frequency division multiple access (OFDMA) can reduce or eliminate intra-sector interference, but inter-sector interference still remains.

The spectral efficiency achievable on the uplink of conventional cellular networks is fundamentally limited by co-channel interference between mobile units sharing the same channel. Consequently, intra-sector interference and/or inter-sector interference begins to diminish the return in spectral efficiency that results from allocating additional transmitter power to mobile units when this limit is approached and the signal-to-interference-plus-noise ratio (SINR) for each mobile unit begins to saturate. The spectral efficiency of the wireless communication system can approach the limits set by co-channel interference when sophisticated error correcting codes, adaptive modulation techniques, and/or incremental redundancy techniques are implemented. However, they cannot overcome this limit. The SINR pattern in the wireless communication system can be improved by imposing a frequency reuse pattern on the network. However, the resulting spectral efficiency is typically even lower than in systems that do not include frequency reuse, at least in part because of the incurred loss in bandwidth within each sector.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for suppressing interference using beamforming of uplink signals received at multiple base stations. The method may include accessing information indicative of a plurality of signals received over a plurality of uplink channels between a plurality of mobile units and a plurality of base stations. The method may also include forming a plurality of weighted signals by applying a plurality of beamforming weights to the plurality of signals. The plurality of beamforming weights are determined based on estimates of the channels from the users to the base stations as well as the interference between users. The method may further include combining subsets of the plurality of weighted signals associated with each of the plurality of mobile units.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 1:
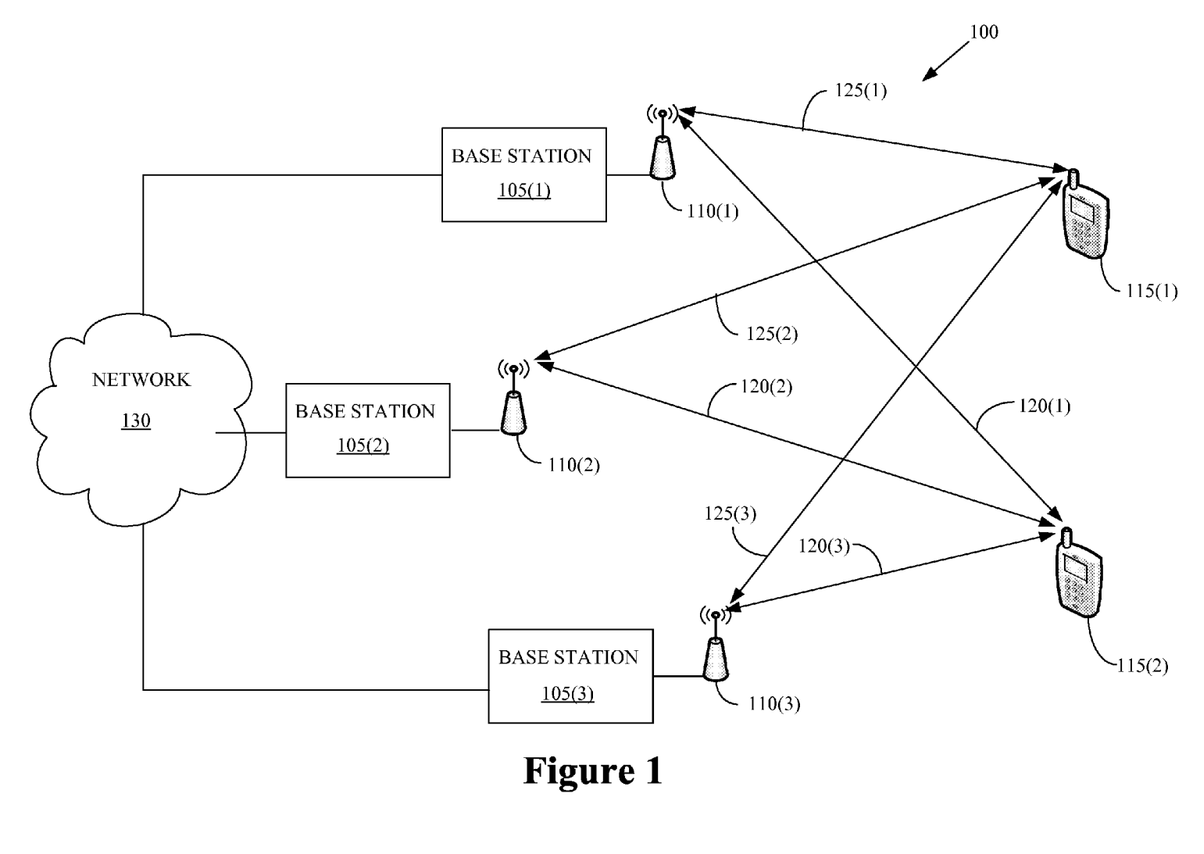
FIG. 1 conceptually illustrates a first exemplary embodiment of a wireless communication system, in accordance with the present invention.

FIG. 1 conceptually illustrates a first exemplary embodiment of a wireless communication system 100. In the illustrated embodiment, a wireless communication system 100 includes a plurality of the base stations 105(1-3) that are used to provide wireless connectivity to one or more sectors or cells. The indices (1-3) may be dropped when referring to the base stations 105 collectively. However, the indices (1-3) may be used to indicate individual base stations 105 or subsets thereof. The same convention may be applied to other elements depicted in the drawings and indicated by a numeral and one or more distinguishing indices. In the illustrated embodiment, the base stations 105 each have a single antenna 110 for transmitting and receiving radiofrequency signals. However, persons of ordinary skill in the art having benefit of the present disclosure should appreciate that the base stations 105 are not limited to having a single antenna 110. For example, in one alternative embodiment, the base stations 105 may each have three antennas for providing wireless connectivity to three sectors. Moreover, in some embodiments, multiple antennas could be deployed with each sector. Persons of ordinary skill in the art having benefit of the present disclosure should also appreciate that wireless connectivity may be provided according to any wireless communication standards and/or protocols. Exemplary wireless communication standards and/or protocols include Universal Mobile Telecommunication Service (UMTS) standards and/or protocols, Global System for Mobile communication (GSM) standards and/or protocols, and the like.

The base stations 105 provide wireless connectivity to one or more mobile units 115 over the air interfaces 120, 125. Although two mobile units 115 are depicted in FIG. 1, persons of ordinary skill in the art having benefit of the present disclosure should appreciate that the present invention is not limited to any particular number of mobile units 115. The air interfaces 120, 125 support one or more downlink channels for transmitting information from the base stations 105 to the mobile units 115 and one or more uplink channels for transmitting information from the mobile units 115 to the base stations 105. In one embodiment in accordance with the present invention, the antennas 110 may function as a single distributed antenna array that is used to receive signals transmitted by the mobile units 115 over the uplink channels of the air interfaces 120, 125. The base stations 105 may therefore be referred to as a coordination cluster.

The base stations 105 that form the coordination cluster may be predetermined or they may be selected dynamically. In one embodiment, the base stations 105 in each coordination cluster in the wireless communication system 100 may be determined based upon the geometry and/or topology of the base stations 105 and/or antennas 110. For example, the coordination cluster may be defined so that each mobile unit 115 may be able to communicate with a selected number of base stations 105. Alternatively, the base stations 105 may be dynamically assigned to a coordination cluster based on current conditions. For example, the base stations 105 in a coordination cluster associated with a mobile unit 115 may be selected based upon the current channel conditions and/or signal strengths associated with the uplink channels between the base stations 105 and the mobile units 115. However, persons of ordinary skill in the art having benefit of the present disclosure should appreciate that these algorithms for assigning base stations 105 to coordination clusters are exemplary and that other algorithms (or combinations of algorithms) may be employed in other embodiments of the present invention.

Information received over the uplink at the base stations 105 may therefore be made accessible to a single entity that may coordinate the combining of the received uplink information. In one embodiment, one of the base stations, such as the base station 105(2), may be designated as a coordinating base station 105(2) for the uplink channels to the mobile unit 115. The coordinating base station 105(2) is able to access information provided to the base stations 105 in the signals transmitted over the uplink channels of the air interfaces 120. The base stations 105 may therefore be communicatively coupled via a network 130 so that the coordinating base station 105(2) can access information received at the other base stations 105(1,3). The network 130 may operate according to any wired and/or wireless communication protocols, such as an Internet Protocol. However, persons of ordinary skill in the art having benefit of the present disclosure should appreciate that the network 130 is optional and in some alternative embodiments the base stations 105 may be communicatively coupled without necessarily utilizing the network 130. For example, some of the base stations 105 may be communicatively coupled using direct wired links between the base stations 105.

Uplink signals transmitted by the two mobile units 115 may interfere with each other, and potentially with other uplink signals received from other mobile units that are not shown in FIG. 1, at the antennas 110. The coordinating base station 105(2), or some other entity in the wireless communication system 100, may therefore implement co-channel interference mitigation techniques to suppress or remove the co-channel interference between the mobile units 115. In one embodiment in accordance with the present invention, the coordinating base station 105(2) estimates one or more beamforming weights that may be applied to the received signals to suppress interference between the mobile units 115. For example, the uplink channels from the mobile units 115 may be estimated. The coordinating base station 105(2) may then calculate one or more beamforming weight vectors to project the reception beam associated with each mobile unit 115 in a direction away from channels associated with the other mobile units 115 (as well as mobile units not shown in the picture) and in a direction that is close to the desired mobile unit 115. One technique for calculating the beamforming weight vectors in this manner is a minimum mean squared error (MMSE) criterion that attempts to maximize the signal-to-noise-plus-interference ratio associated with each of the mobile units 115. Exemplary MMSE techniques are known in the art and in the interest of clarity will not be described herein.

The beamforming weight vectors may then be applied to the signals received from the mobile units 115. For example, one set of beamforming weight vectors may be applied to the signals received at the base stations 105 in order to recover the transmitted signal from the mobile unit 115(1) and another set of beamforming weight vectors may be applied to the signals received at the base stations to recover the transmitted signal from the mobile unit 115(2). The weighted signals associated with each of the mobile units 115 may then be combined to form a single signal representative of the information transmitted by the mobile unit 115 over the uplink channel. In the illustrated embodiment, the signals provided by the mobile units 115 are received at the same subset of base stations 105. However, in alternative embodiments, different subsets of the base stations 105 may be associated with different mobile units 115 or subsets thereof. For example, the subset of base stations 105 for each mobile unit 115 may be selected based upon strengths of signals transmitted on the uplink.

The increase in spatial dimensionality resulting from coherent beamforming across multiple coordinated base stations allows the dominant interferes affecting each mobile unit 115 to be suppressed quite effectively, thereby greatly increasing the attainable spectral efficiency of the wireless communication system 100. Furthermore, uplink coordination between the base stations 105 does not require any over-the-air exchange of information that is not already provided by conventional techniques. Thus, embodiments of these techniques may be implemented without requiring any modification to existing wireless communication standards. Persons of ordinary skill in the art should also appreciate that the base stations 105 are not restricted to linear beamforming techniques. Nonlinear techniques, such as successive interference cancellation, may also be implemented in alternative embodiments.

Figure 2:
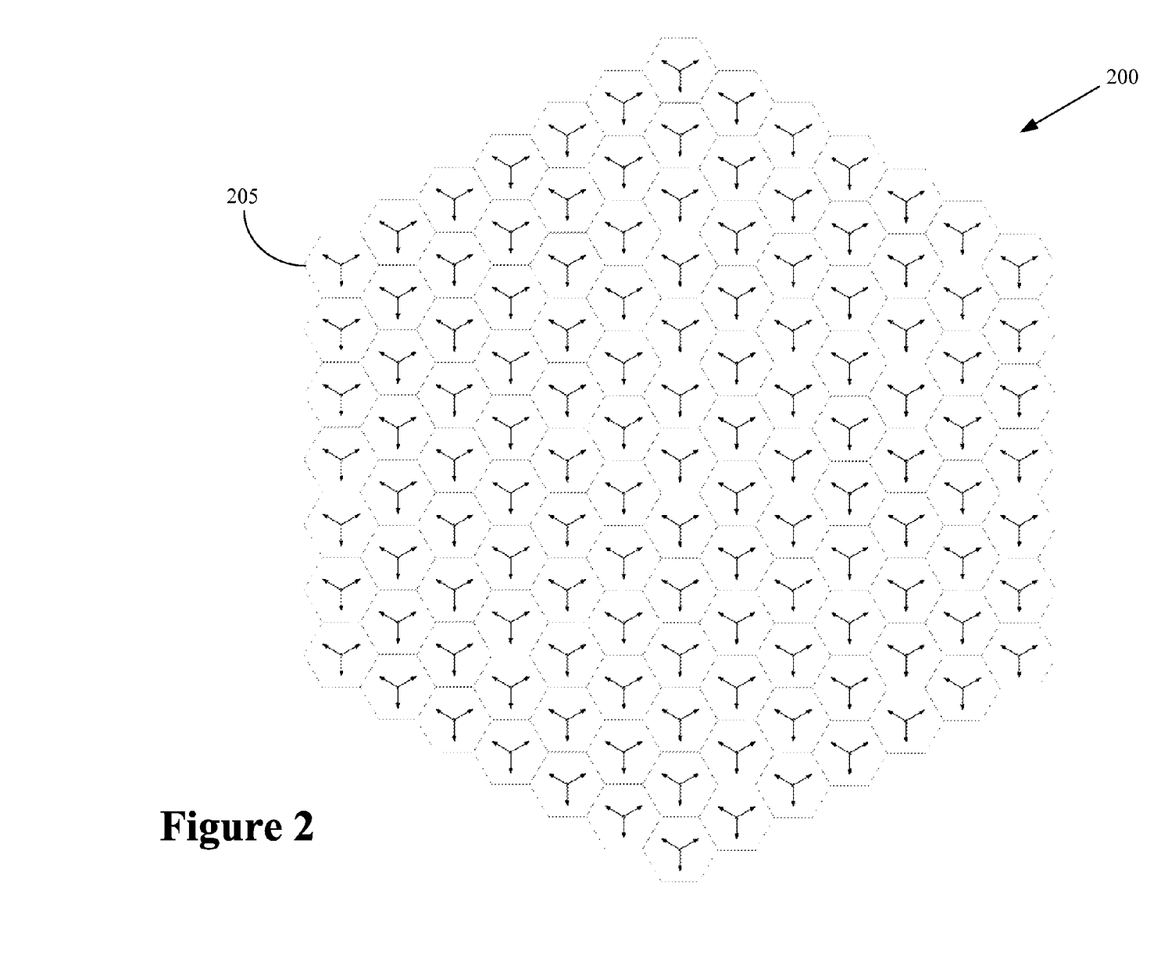
FIGS. 2-6 conceptually illustrate second, third, fourth, fifth, and sixth exemplary embodiments of a wireless communication system, respectively, in accordance with the present invention.

FIG. 2 conceptually illustrates a second exemplary embodiment of a wireless communication system 200. In the illustrated embodiment, the wireless communication system 200 includes an idealized cellular network of 127 regular hexagonal cells 205 that shows a center cell plus 6 rings of neighboring cells 205 with a base station at the center of each cell 205. The wireless communication system 200 is assumed to be wrapped around at the edges so that each base station sees the same environment as the one in the center cell of FIG. 1. Persons of ordinary skill in the art having benefit of the present disclosure should appreciate that a second exemplary embodiment of the wireless communication system 200, as well as other embodiments depicted herein, is intended to be exemplary and not to limit the present invention. In particular, persons of ordinary skill in the art having benefit of the present disclosure should appreciate that the network of regular hexagonal cells 205 is an idealization that is used to illustrate relevant principles of the present invention without obscuring the discussion by including complications that may arise when implementing actual communication networks, such as irregularly shaped cells 205, time-varying cells 205, overlapping cells 205, holes in the coverage of the wireless communication system 200, and the like.

In the illustrated embodiment, the wireless communication system 200 is assumed to be populated with one user per sector antenna (i.e., one user per spatial dimension). The users are served at a common data rate, except for a small fraction that is consigned to outage due to unfavorable channel conditions. However, persons of ordinary skill in the art having benefit of the present disclosure should appreciate that the present invention is not limited to serving users at a common data rate. In alternative embodiments, the wireless communication system 200 may implement algorithms for selecting data rates on a per user basis, e.g. based upon channel conditions, channel quality information, and the like, subject to appropriate fairness criteria. The wireless communication system 200 may also implement algorithms for identifying the subset of users that are declared in outage, as well as the powers at which the remaining users transmit and the coordination clusters that receive transmission from each user. The common data rate may be determined to be the largest common data rate that is consistent with the desired user outage probability for coordination clusters of a selected size. The model of the wireless communication system 200 also assumes sufficient backhaul bandwidth and latency requirements to facilitate the joint processing of received signals by several base stations.

Each cell 205 has three sectors and the main lobe directions of the sectors are indicated by the arrows in each cell 205. There are N receiving antennas per sector and each receiving antenna has an idealized antenna beam pattern given by:

$$A(\theta) = \min\left\{12\left(\frac{\theta}{\Theta}\right)^2, A_m\right\}, -\pi \le \theta \le \pi,$$

where $A(\theta)$ represents the beam attenuation in decibels along a direction making an angle of $\theta$ radians with the main lobe direction. The parameters $\Theta$ and $A_m$, are respectively the 3-dB beamwidth (in radians) and the maximum beam attenuation (in dB). In the illustrated embodiment, the parameters are set to $\Theta$=70 degrees and $A_m$=20.

The channels of the wireless communication links are estimated by assuming that all user-to-sector links in the network are flat-fading and time-invariant and that there is perfect symbol synchronization between all users at each sector. Further, each user in the network is assumed to have a single omni-directional transmitting antenna. Accordingly, the complex baseband signal vector, $y_s(t) \in C^N$ received at the N antennas of sector s during symbol period t can be modeled as:

$$y_s(t) = \sum_{u=1}^{U} h_{s,u} x_u(t) + z_s(t),$$

where, U is the total number of users in the network; $x_u(t) \in C$ is the complex baseband signal transmitted by user u during symbol period t; $h_{s,u}(t) \in C^N$ is the vector representing the channel from user u to sector s; and $z_s(t) \in C^N$ is a circularly symmetric complex Gaussian vector representing additive receiver noise, with $E[z_s(t)]=0$ and $E[z_s(t)z_s^*(t)]=I$. Each user is also subject to a transmitted power constraint of 1, i.e., $E|x_u(t)|^2 \leq 1$.

In the illustrated embodiment, each channel vector $h_{s,u}$ has a position-dependent power loss component, a lognormal shadow fading component, and a complex Gaussian multipath fading component. Specifically, $$h_{s,u} = \sqrt{\frac{\eta}{d_{s,u}^\alpha 10^{A(\theta_{s,u})/10} 10^{\gamma_{s,u}/10}}} g_{s,u}$$

where $d_{s,u}$ is the distance in km between user u and sector s; $\alpha$ is the path loss exponent, which is taken to be 3.8; $\theta_{s,u} \in [-\pi,\pi]$ is the angle in radians that the position vector of user u relative to sector s makes with the main lobe direction of sector s; $A(\ldots)$ is the sector antenna beam pattern such as defined above; $\gamma_{s,u}$ is a real Gaussian random variable of mean 0 and standard deviation 8, representing the effects of large-scale shadow fading; and $g_{s,u}$ is an N-dimensional circularly symmetric complex Gaussian vector of mean 0 and covariance I, representing the effects of small-scale multipath fading. For each user u, the shadow fading random variables $\gamma_{s,u}$ corresponding to different sectors s are assumed to be jointly Gaussian, with 100% correlation between sectors of the same cell and 50% correlation between sectors of different cells. But for these constraints, the random variables $\gamma_{s,u}$, $g_{s,u}$, and $z_s(t)$ for different s, u, and t are all statistically independent.

Under all the above assumptions, the parameter $\eta$ can be interpreted as the average SNR at sector s of a user u located at 1 km along the main lobe direction ($d_{s,u}=1$ and $\theta_{s,u}=0$), when the shadow fading random variable $\gamma_{s,u}$ is at its mean value of 0 (or, equivalently, when there is no shadow fading). The transmitter power available to each user and the noise power at each sector antenna is normalized to 1 so that the value of $\eta$ accounts for the net effect of the actual transmitter power, the bandwidth of operation, the average path loss at some reference distance, all antenna gains, the amplifier noise figures, as well as other parameters. The SNR distribution over the network is then determined by $\eta$, the path loss exponent (which is taken to be 3.8), and the cell radius (1.6 km). As $\eta$ is increased from a very small value to a very large value, the network goes from being limited primarily by receiver noise to being limited primarily by interference between users. The mitigation of interference through coordinated reception at multiple base stations may therefore be more beneficial at higher $\eta$ values. The simulated coordination gain may be determined as a function of $\eta$ by varying the latter over a wide range of values (12 dB to 36 dB).

A coordination cluster is defined to be a subset of the base stations in the network that jointly process the received signals at the antennas of all their sectors. In the illustrated embodiment, the network has a predefined set of coordination clusters and each user in the network can be assigned to any one of these clusters. Each cluster uses a linear minimum-mean-squared-error (MMSE) receiver to detect each user assigned to it in the presence of interference from all other users in the network. To highlight the dependence of the spectral efficiency gain on the number of rings of neighbors with which each base station is coordinated, the illustrated embodiment assumes that the coordination clusters have a predetermined r-ring coordination cluster. For any integer r>0, an r-ring coordination cluster consists of any base station and the first r rings of its neighboring base stations (accounting for wraparound), and $C_r$ to be the set of all r-ring coordination clusters in the network. FIGS. 3, 4, 5, and 6 illustrate 0-ring, 1-ring, 2-ring, and 4-ring coordination clusters, respectively. Note that each base station is at the center of a unique cluster in $C_r$. As a result, all cells are equally favored from the point of view of coordination. The resulting spatial homogeneity is one reason to consider overlapping clusters instead of disjoint ones. The total number of base stations in each coordination cluster in $C_r$ is $3r^2+3r+1$. This is also the number of clusters in $C_r$ to which any given base station in the network belongs.

Figure 3:
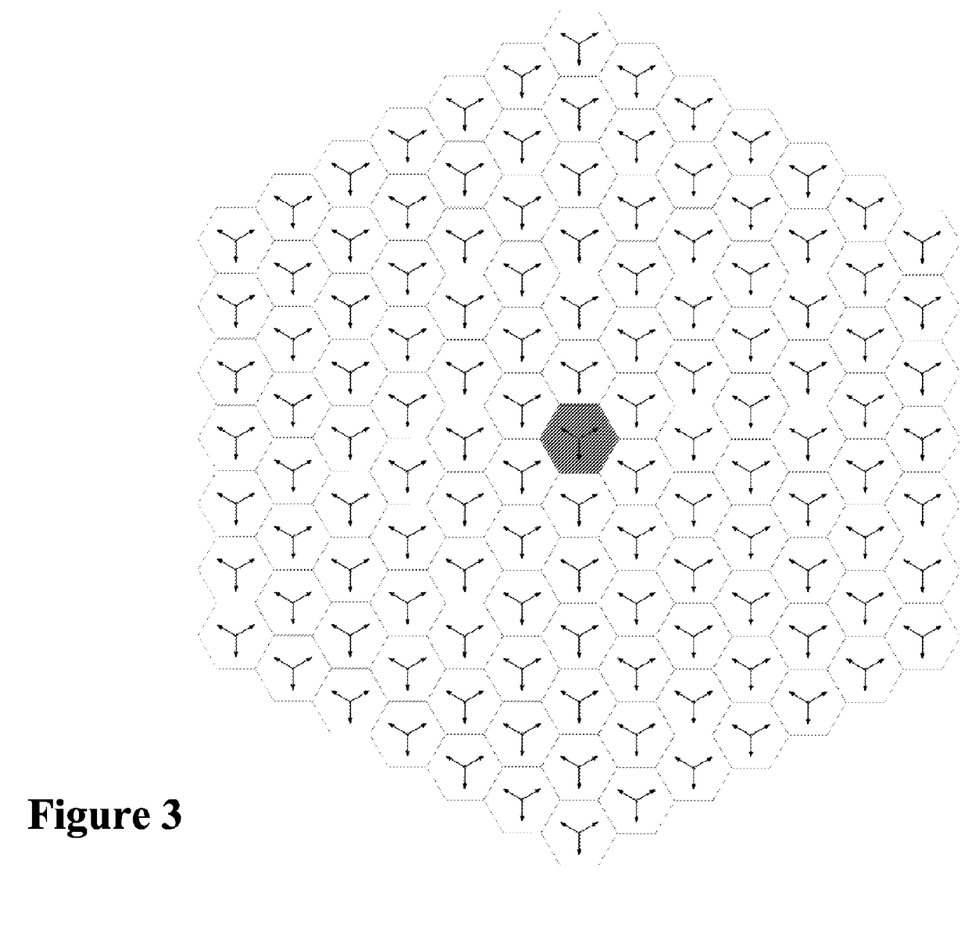
Figure 4:
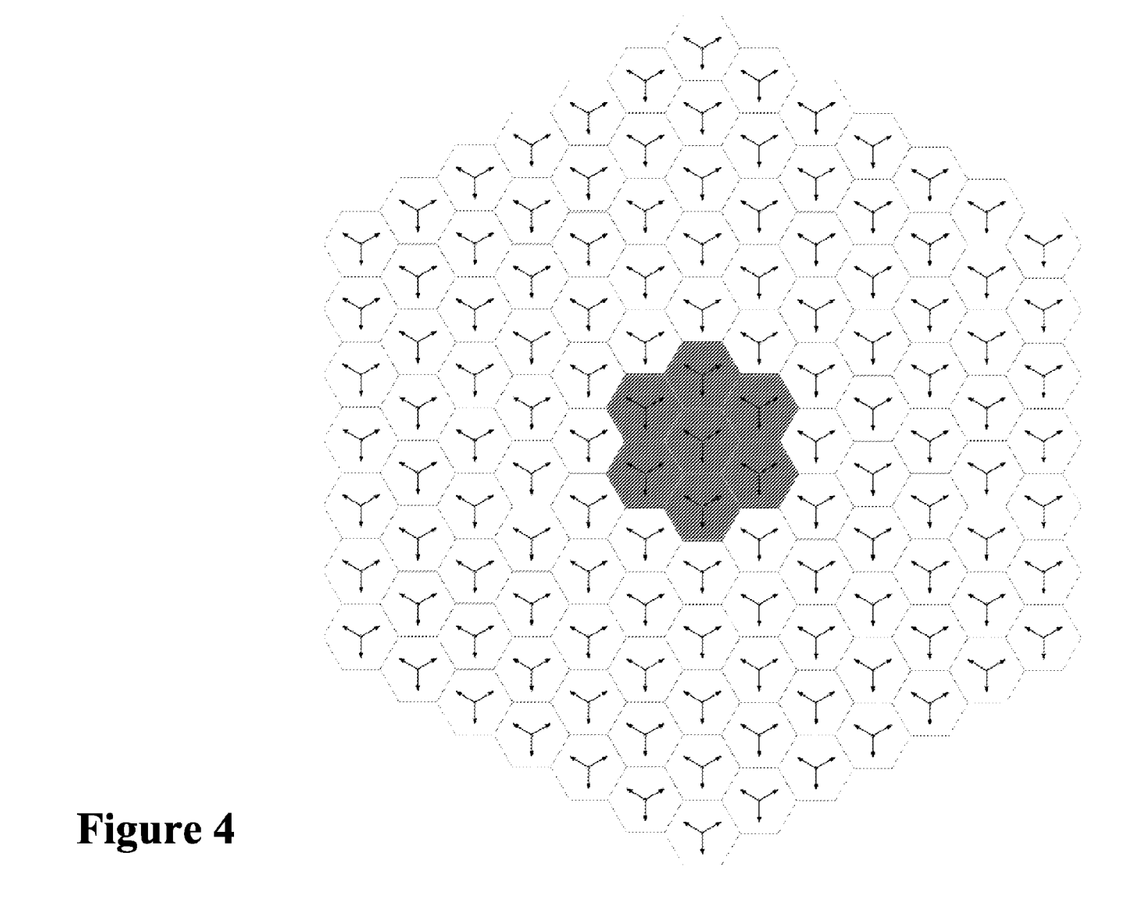
Figure 5:
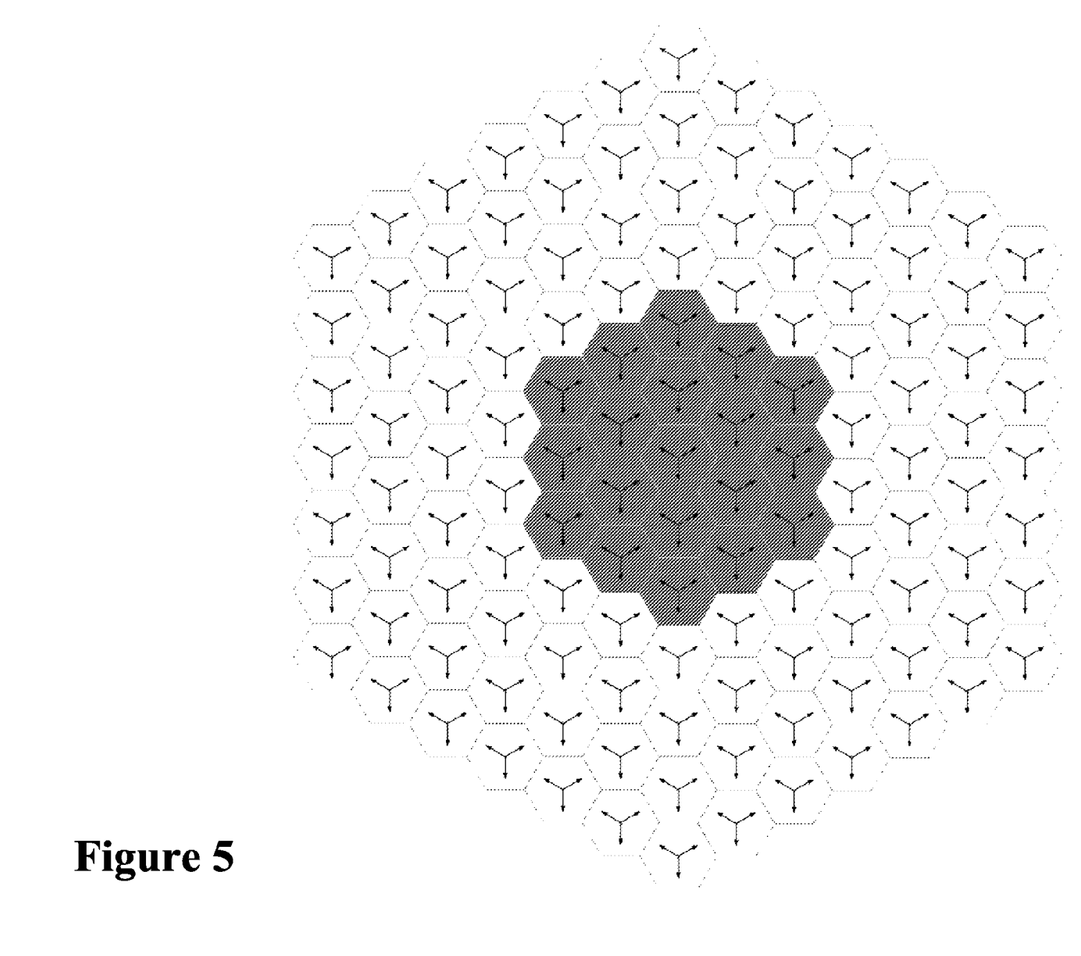
Figure 6:
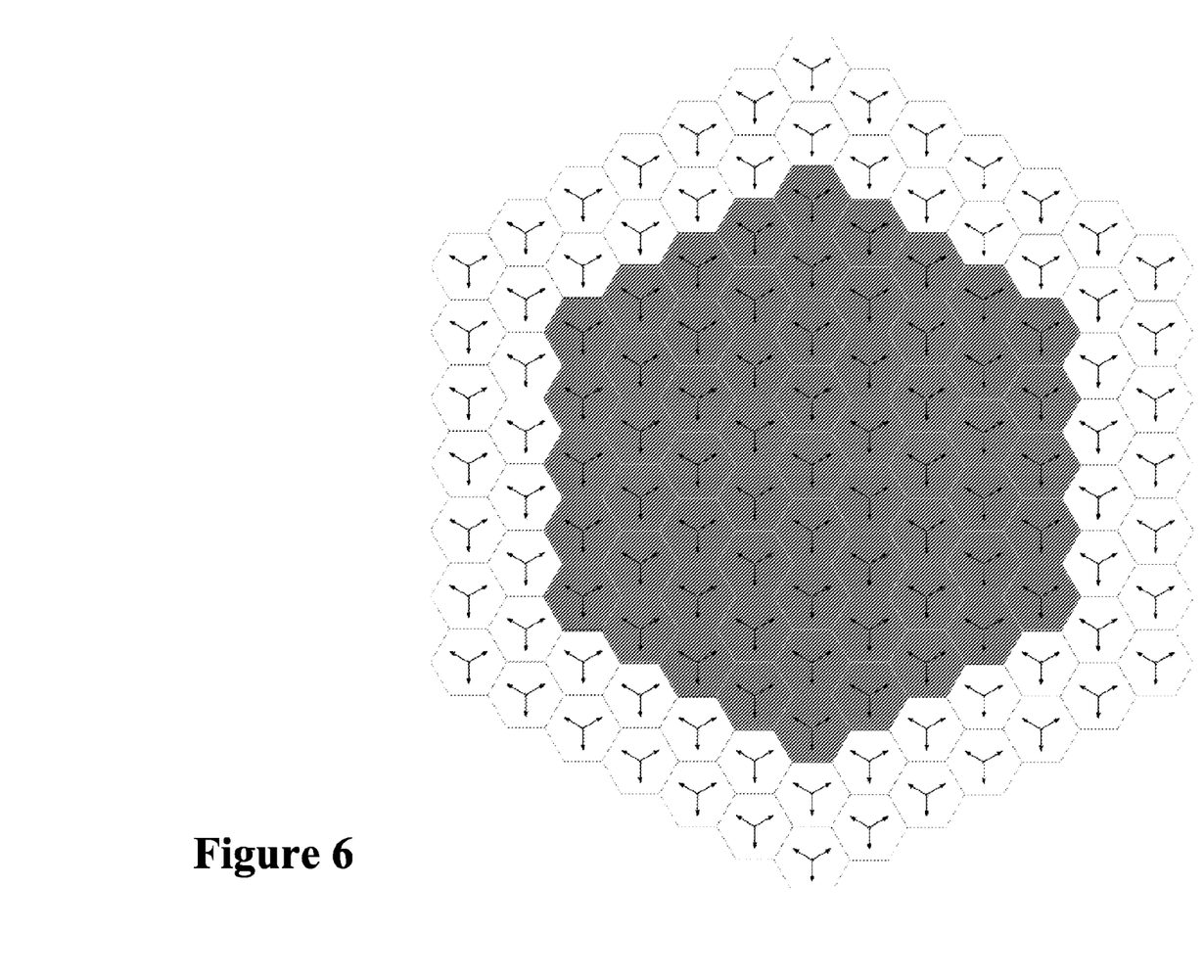

To ensure that coordination is truly limited to the first r rings of neighbors, exchange of information between clusters in $C_r$ through base stations that they may have in common is disallowed. Clearly, when $C_0$ is chosen as the set of coordination clusters in the network, as shown in FIG. 3, there is no coordination at all between base stations. In the simulations, this case may serve as the benchmark in estimating the spectral efficiency gain achievable with sets of larger coordination clusters. Specifically, the embodiments shown in FIGS. 4, 5, and 6 ($C_1$, $C_2$, and $C_4$) can be compared with $C_0$. The channel from user u to the antennas of all the base stations in the coordination cluster C can be denoted $h_{C,u} \in C^{3N|C|}$ (here |C| denotes the number of base stations in C). Then, with user u transmitting power $p_u$ the SINR attained by user u at cluster C is $$h_{C,u}^* \left( I + \sum_{v \neq u} p_v h_{C,v} h_{C,v}^* \right)^{-1} h_{C,u} p_u.$$

Note that this expression assumes perfect knowledge at cluster C of the channel vector $h_{C,u}$ and the composite interference covariance $$\left( \sum_{v \neq u} p_v h_{C,v} h_{C,v}^* \right).$$

The objective of the simulations is to compare the spectral efficiencies achievable with the coordination cluster sets $C_0$, $C_1$, $C_2$, and $C_4$ when all users in the network target a constant and common data rate. For meaningful results, a small fraction of the users are allowed to be in outage due to unfavorable channel conditions. For example, the allowed user outage probability is assumed to be 10%. For each set of coordination clusters, the rate per user that results in 10% user outage is obtained by determining the user outage probability for a few target rates and then interpolating between those rates. Given a target rate per user of R bits/sym, the resulting user outage probability may be determined from several iterations of the following steps:

1. Populate the network with users.
2. Determine how many of the above users must be declared in outage, so that the remaining users can all attain the target rate of R bits/sym. The user outage probability may be determined by summing the number of users in outage across trials and dividing by the total number of users in those trials. With a large enough network, the number of users in outage is expected to vary only slightly from trial to trial.

The network is populated with users by assuming that the network is loaded randomly and uniformly with N users per sector, N being the number of receiving antennas in each sector. The justification for this assumption is that a larger pool of users can be split between orthogonal dimensions, e.g., time slots or frequency bands, so that there are only N users per sector in each dimension (note that such dimensions may be assumed to be orthogonal over the entire network, and not just within each sector). N users associated with sector s are chosen to have higher average path gain to sector s than to any other sector, while ensuring that users are equally likely to be situated at all locations in the network. The average path gain from user u to sector s is the quantity under the square root sign in the above expression for the channel estimate. To obtain a user associated with sector s, a random location in the center cell of the network is selected with a uniform distribution, the shadow fading random variables for all sectors are selected, and the sector with the highest average path gain is determined. The cell to which the selected location in the center cell must be translated is determined, as well as the angle (0, 120 deg, or 240 deg) by which it must then be rotated so that it ends up having highest average path gain to the desired sectors, after the shadow fading random variables are permuted appropriately to account for the translation and rotation. Once the locations of the users and the shadow fading random variables on all user-to-sector links have been determined as above, the multipath fading random variable for the link from each user to each sector antenna is determined to obtain all the channel vectors $h_{s,u}$.

The users in outage are determined by assuming that the set of coordination clusters in the network is C, for some r>0. Let the target rate for each user in the network be R bits/sym. Since there are 3N users per cell, the offered load to the network is then 3NR bits/sym/cell. Gaussian signaling and ideal coding are assumed so that the target rate of R bits/sym translates to a target SINR of $\rho=2^{R}-1$ for each user.

In one case, no users are in outage. To begin with, suppose that the target SINR $\rho$ is small enough for all the users to achieve it, given the power constraint on each user and the interference between users. This means that there exists a feasible setting of each user's transmitted power, and a corresponding assignment of users to coordination clusters, such that each user attains an SINR of $\rho$ or higher at its assigned cluster, with an SINR-maximizing linear MMSE receiver. In this situation, the following iterative algorithm determines the transmitted powers and cluster assignments:

1. Initialize all user powers to 0: $p_u^{(0)}=0$ for all u.
2. Given user powers $\{p_u^{(n)}\}$, $n \geq 0$ assign user u to the cluster $C_u^{(n)}$ here it would attain the highest SINR:

$$C_u^{(n)} = \operatorname*{argmax}_{C \in C_r} h_{C,u}^* \left( I + \sum_{v \neq u} p_v h_{C,v} h_{C,v}^* \right)^{-1} h_{C,u}$$

Let $p_u^{(n-1)}$ be the power required by user u to attain the target SINR of p at the cluster $C_u^{(n)}$ assuming every other user v continues to transmit at the current power level $p_v^{(n)}$ 3. Iterate until convergence.

The above iteration has been shown to converge to transmitted powers $\{\bar{p}_u\}$ that are optimal in the following strong sense: if it is possible for every user to attain the target SINR of $\rho$ with transmitted powers $\{p_u\}$ then $p_u > \bar{p}_u$ for every u. In other words, the iteration minimizes the power transmitted by every user, subject to the target SINR of $\rho$ being achieved by all users.

In other cases, some users may be in outage because it may not be possible for all the users to achieve the target SINR simultaneously. In such a situation, only a subset of the users may be served and the rest may be declared to be in outage. In one embodiment, the largest supportable subset of users may be determined by sequentially examining all subsets of users in decreasing order of size, but this approach is practical only when the number of users is small. Alternatively, the iterative algorithm described above may be modified slightly to obtain a computationally efficient algorithm for determining which subset of users should be served. After each iteration, the modified algorithm declares users whose updated powers exceed the power constraint to be in outage and eliminates them from consideration in future iterations. This progressive elimination of users eventually results in a subset of users that can all simultaneously achieve the target SINR $\rho$. For this subset of users, the algorithm then finds the optimal transmitted powers and cluster assignments. The user subset itself need not be the largest possible because a user consigned to outage in some iteration may not be resurrected in a future iteration.

One embodiment of the modified algorithm includes:

1. Start with no user in outage, and all user powers initialized to zero: $p_u^{(0)}=0$ for all u.
2. Given user powers $\{p_u^{(n)}\}$, $n \geq 0$ assign each user u not in outage to the cluster $C_u^{(n)}$ as discussed above and update its power to the value $p_u^{(n-1)}$.
3. Declare users u such that $p_u^{(n+1)} > 1$ to be in outage, and reset their powers to zero in all future iterations.
4. Iterate until convergence.

Figure 7:
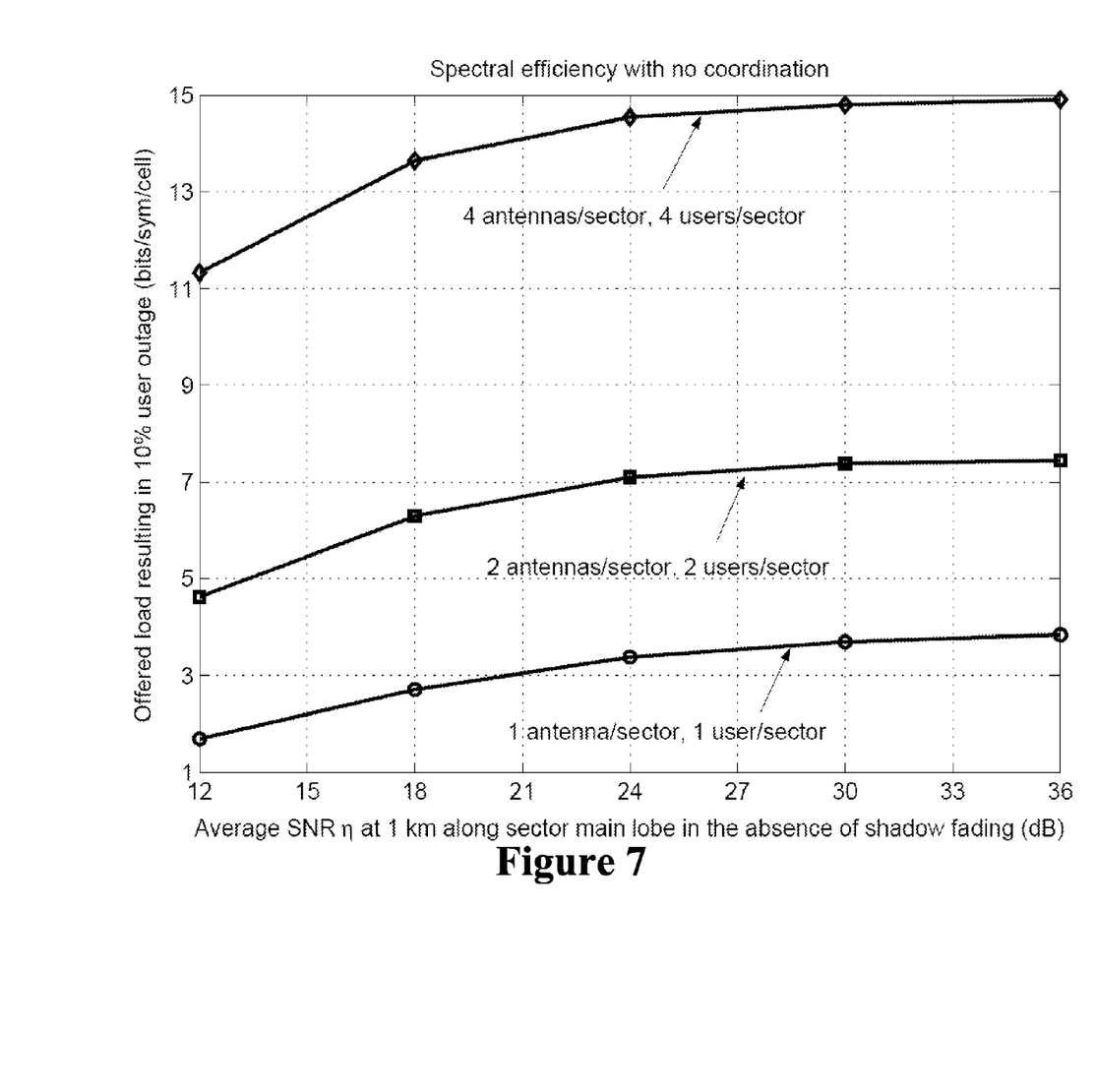
FIGS. 7-10 show results of the simulations performed for the second, third, fourth, fifth, and sixth exemplary embodiments of a wireless communication system shown in FIG. 2-6, in accordance with the present invention.

FIGS. 7-10 show results of the simulations described above. The results are for simulations that consider three different values for N, the number of antennas per sector as well as the number of users per sector, viz., N=1, N=2, and N=4. FIG. 7 shows the network spectral efficiency for each value of N as a function of the parameter $\eta$, with $C_0$ as the set of coordination clusters, i.e., with no coordination between base stations. The spectral efficiency is measured in terms of the offered load to the network (in bits/sym/cell) that results in 10% user outage. Recall that $\eta$ is the average SNR at any sector of a user at 1 km along the main lobe direction of that sector, in the absence of shadow fading. For each value of N, when $\eta$ is small, receiver noise dominates interference from other users, and therefore the spectral efficiency increases appreciably with $\eta$. However, at high values of $\eta$, the spectral efficiency begins to saturate as the network becomes limited by interference between users, rather than receiver noise. It is this limit that embodiments of the techniques described herein may overcome through the coordination of base stations.

Figure 8:
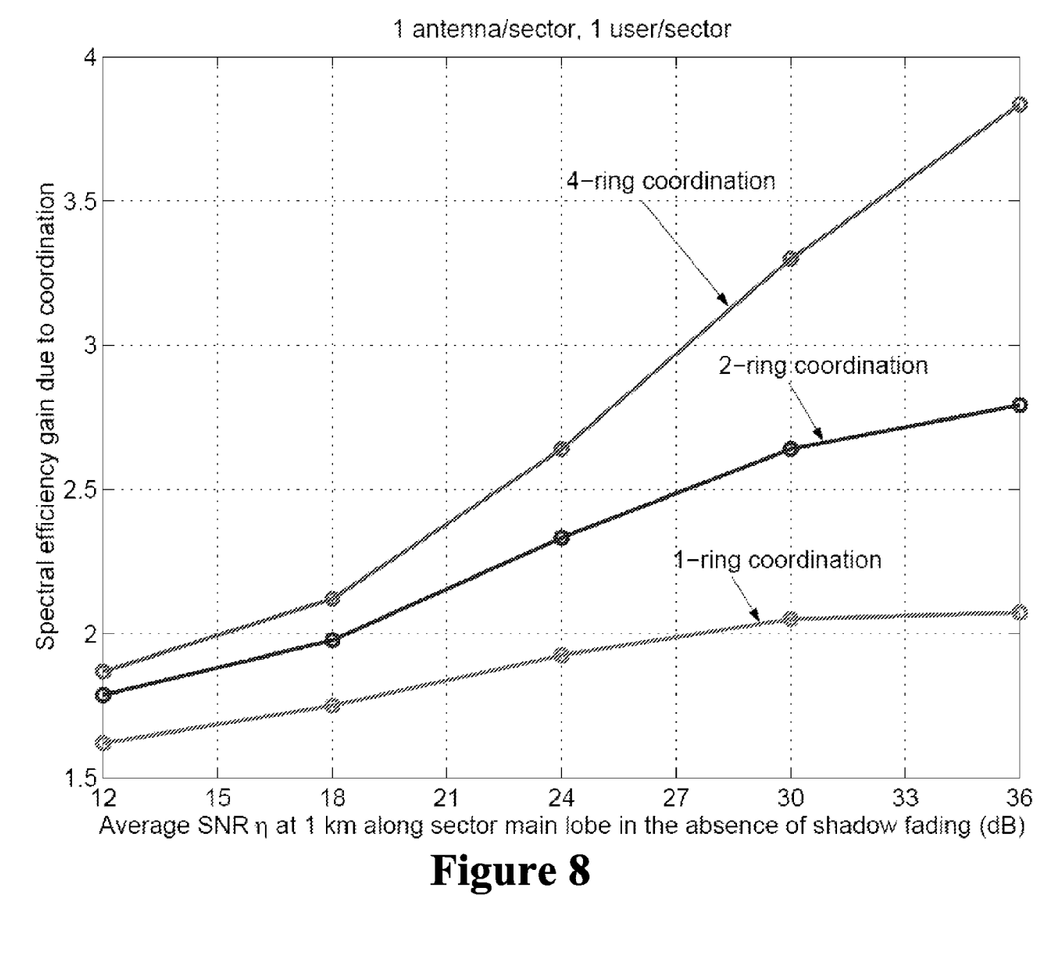
Figure 9:
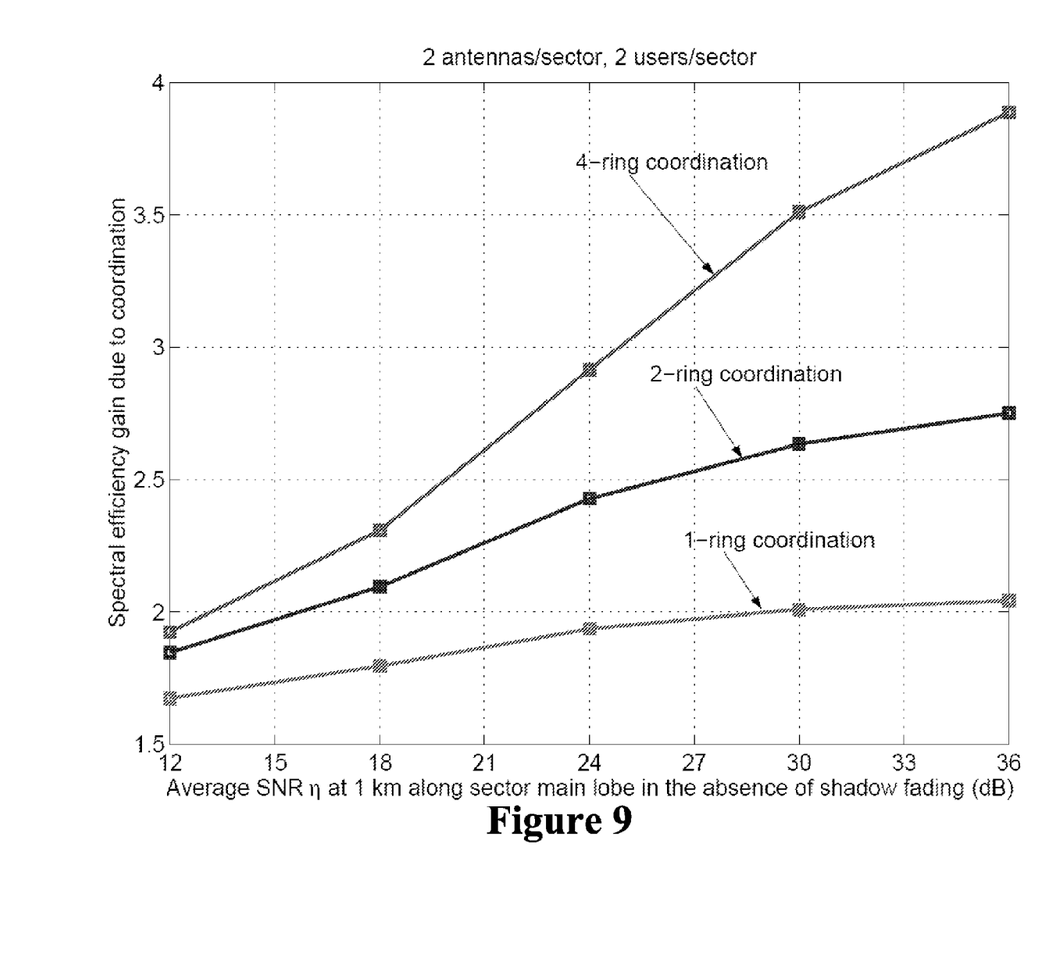
Figure 10:
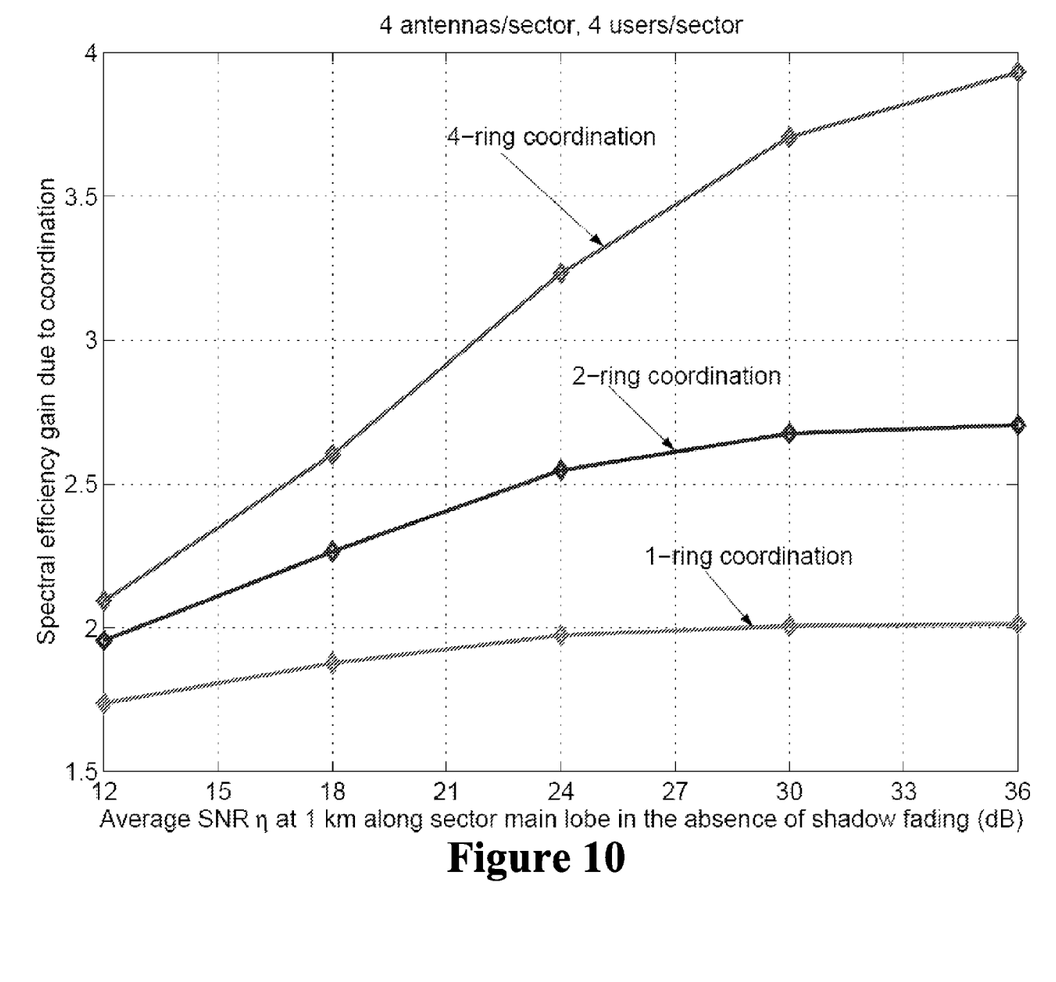

FIGS. 8, 9, and 10 illustrate the spectral efficiency gain achievable with different coordination cluster sizes, for the three values of N under consideration. Specifically, each figure shows the ratio of the spectral efficiency achievable with $C_1$ (1-ring coordination), $C_2$ (2-ring coordination), and $C_4$ (4-ring coordination) to that achievable with $C_0$ (no coordination), for a different value of N. The following observations can be made:

1. As expected, the coordination gain increases with the SNR parameter η in each case, because interference mitigation becomes more helpful as the level of interference between users goes up relative to receiver noise.

2. At the low end of the q range, most of the spectral efficiency gain comes just from 1-ring coordination. This is because most of the interferers that are significant relative to receiver noise are within range of the first ring of surrounding base stations. However, as η is increased, interferers that are further away start to become significant relative to receiver noise, and therefore it pays to increase the coordination cluster size correspondingly.

3. The coordination gain values are not very sensitive to N, the number of antennas per sector as well as the number of users per sector, suggesting that it is the ratio of users to sector antennas (one in all our results) that matters.

When the user-to-sector-antenna ratio is smaller than one, the coordination gain may be somewhat lower since, even without coordination, each base station can then use the surplus spatial dimensions to suppress a larger portion of the interference affecting each user it serves.

5. The coordination gain with a user-to-sector-antenna ratio larger than one will also be lower, because the composite interference affecting each user at any coordination cluster will then tend towards being spatially white, making linear MMSE detection less effective at interference suppression.

The results from the simulations indicate that the uplink spectral efficiency can potentially be doubled with 1-ring coordination and nearly quadrupled with 4-ring coordination, in a high-SNR environment. Thus, the techniques described herein may alleviate cochannel interference on the uplink of today's cellular networks by coordinating several base stations in the reception of user signals and exploiting the increased spatial dimensionality to suppress interference between users (specifically, using linear MMSE detection). Simulation results suggest a potential gain in spectral efficiency (under high SNR conditions) of 100% when every base station is coordinated with its first ring of neighbors, and nearly 300% when every base station is coordinated with its first four rings of neighbors.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed:

1. A method, comprising:
    accessing information indicative of a plurality of signals received over a plurality of uplink channels between a plurality of mobile units and a plurality of base stations;
    forming a plurality of weighted signals by applying a plurality of beamforming weights to the plurality of signals, the plurality of beamforming weights being determined based on estimates of the channels from the plurality of users to the plurality of base stations and the interference between said users; and
    combining subsets of the plurality of weighted signals associated with each of the plurality of mobile units, each subset comprising weighted signals received by each of the plurality of base stations.

2. The method of claim 1, wherein accessing the information indicative of the plurality of signals comprises:
    accessing, at a first base station, information indicative of a first subset of the plurality of signals, the first subset of the plurality of signals being received at a first base station; and
    receiving, at the first base station, information indicative of at least one second subset of the plurality of signals, said at least one second subset of the plurality of signals being received by at least one second base station.

3. The method of claim 1, comprising determining the plurality of beamforming weights based on the estimated interference between the plurality of signals.

4. The method of claim 3, wherein estimating the plurality of beamforming weights comprises estimating the plurality of uplink channels between the plurality of mobile units and the plurality of base stations.

5. The method of claim 4, wherein estimating the plurality of beamforming weights comprises estimating the interference between the plurality of signals based on the plurality of estimated uplink channels and the plurality of received signals.

6. The method of claim 5, wherein estimating the plurality of beamforming weights comprises estimating the plurality of beamforming weights using a minimum mean square error criterion to maximize a plurality of signal-to-interference-plus-noise ratios associated with the plurality of signals.

7. The method of claim 3, wherein determining the plurality of beamforming weights comprises determining a plurality of beamforming weights associated with antennas associated with the plurality of base stations.

8. The method of claim 1, comprising determining a plurality of transmission rates associated with the plurality of uplink channels based on the plurality of weighted signals.

9. The method of claim 1, comprising selecting the plurality of base stations associated with each of the plurality of mobile units.

10. The method of claim 9, comprising selecting the plurality of base stations based upon a geometry or topology of the base stations.

11. The method of claim 9, comprising selecting the plurality of base stations based upon at least one of a channel condition or a signal strength associated with signals received over the uplink channels.

12. The method of claim 9, wherein selecting the plurality of base stations associated with each of the plurality of mobile units comprises selecting a different plurality of base stations for different portions of the plurality of mobile units.

13. A method, comprising:

accessing information indicative of a plurality of signals received over a plurality of uplink channels between a plurality of mobile units and a plurality of base stations;

forming a plurality of weighted signals by applying a plurality of beamforming weights to the plurality of signals, the plurality of beamforming weights being determined based on estimates of the channels from the plurality of users to the plurality of base stations and the interference between said users; and combining subsets of the plurality of weighted signals associated with each of the plurality of mobile units, wherein combining the subsets of the plurality of weighted signals comprises combining subsets of the plurality of weighted signals associated with each of the plurality of mobile units to suppress interference associated with the other mobile units.

14. The method of claim 13, wherein combining the subsets of the plurality of weighted signals comprises performing interference cancellation to suppress interference associated with the other mobile units.

15. The method of claim 14, wherein combining the subsets of the plurality of weighted signals comprises combining the subsets of the plurality of weighted signals using at least one of a linear beamforming technique or a non-linear technique.

16. The method of claim 14, wherein combining the subsets of the plurality of weighted signals using a non-linear technique comprises combining the subsets of the plurality of weighted signals using a successive interference calculation.

* * * * *